United States Patent
Tazartes et al.

(10) Patent No.: US 9,541,399 B2
(45) Date of Patent: Jan. 10, 2017

(54) FIBER OPTIC GYROSCOPE WITH FRONT END POLARIZER

(71) Applicants: Daniel A. Tazartes, West Hills, CA (US); Bassam S. Dimashkie, Simi Valley, CA (US)

(72) Inventors: Daniel A. Tazartes, West Hills, CA (US); Bassam S. Dimashkie, Simi Valley, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 151 days.

(21) Appl. No.: 13/676,878

(22) Filed: Nov. 14, 2012

(65) Prior Publication Data

US 2014/0132961 A1    May 15, 2014

(51) Int. Cl.
  *G01C 19/72* (2006.01)
  *G01C 25/00* (2006.01)

(52) U.S. Cl.
  CPC ............. *G01C 19/721* (2013.01); *G01C 19/72* (2013.01); *G01C 25/00* (2013.01); *Y10T 29/49826* (2015.01)

(58) Field of Classification Search
  CPC ................ G01C 19/72; G01C 19/721–19/722; G01C 19/726–19/727; G01C 19/64; G01C 19/66; G01P 3/363; G01P 15/14; G01P 9/02; G02B 6/126; G02B 6/024; G02B 6/105

USPC .......... 356/460, 477, 464, 450, 28.5; 385/12
See application file for complete search history.

(56) References Cited

U.S. PATENT DOCUMENTS

| | | | |
|---|---|---|---|
| 5,260,768 A * | 11/1993 | Cordova et al. | 356/460 |
| 5,289,259 A * | 2/1994 | Spammer et al. | 356/463 |
| 5,335,064 A * | 8/1994 | Nishiura et al. | 356/460 |
| 5,377,283 A * | 12/1994 | Blake et al. | 385/11 |
| RE35,023 E | 8/1995 | Ferrar | |
| 5,486,916 A * | 1/1996 | Michal et al. | 356/483 |
| 5,598,489 A * | 1/1997 | Pavlath et al. | 385/12 |
| 5,949,930 A | 9/1999 | Cordova et al. | |
| 6,115,124 A * | 9/2000 | Hall et al. | 356/460 |
| 6,330,105 B1 * | 12/2001 | Rozelle et al. | 359/347 |
| 6,351,575 B1 * | 2/2002 | Gampp | G02B 6/126 385/14 |
| 7,805,441 B2 | 9/2010 | Madhavan et al. | |
| 2004/0091207 A1 * | 5/2004 | Ohno et al. | 385/27 |
| 2010/0238451 A1 * | 9/2010 | Strandjord et al. | 356/460 |
| 2010/0302548 A1 * | 12/2010 | Digonnet et al. | 356/465 |

* cited by examiner

*Primary Examiner* — Tarifur Chowdhury
*Assistant Examiner* — Mohamed K Amara
(74) *Attorney, Agent, or Firm* — Tarolli, Sundheim, Covell & Tummino LLP

(57) ABSTRACT

A fiber optic gyroscope (FOG) is provided. The FOG comprises a depolarizer that receives light from a light source, a multifunction integrated optic chip (MIOC) and a sensing coil coupled to outputs of the MIOC. The FOG also includes a polarizer coupled between an output of the depolarizer and an input of the MIOC. The polarizer mitigates polarization non-reciprocity (PNR) bias error and enhances the polarization extinction ratio (PER) of the FOG.

13 Claims, 6 Drawing Sheets

FIBER OPTIC GYROSCOPE WITH FRONT END POLARIZER

TECHNICAL FIELD

The present invention relates generally to gyroscopes, and more particularly to a fiber optic gyroscope with a front end polarizer.

BACKGROUND

An interferometric fiber optic gyroscope (FOG) 10, as illustrated in FIG. 1, includes an optical signal light source 12 that provides an optical signal to a fiber optic sensing coil 28. A typical optical signal light source includes a laser diode that provides pump light to a gain fiber. The gain fiber includes a dopant that absorbs pump light and then emits an optical signal that is suitable for delivery. Within the FOG 10, a multifunction integrated optic chip (MIOC) 20 is connected to the fiber optic sensing coil 28. The MIOC 20 includes components such as a polarizer 22, a phase modulator 26 and a Y-coupler (splitter/combiner 24) that are used in processing and controlling optical signals input to and from the fiber optic sensing coil 28. The output of the FOG 10 is an intensity that can be used to determine the phase difference between the two counter-propagating waves. A portion of the output is returned to the light source 12 through a splitter 16 and a second portion of the output is provided to a photodetector 14 through the splitter 16 for measuring the phase difference. The rotation rate of the coil about its sensing axis is obtained by dividing this phase difference by a scale factor of the FOG 10, referred to as the Sagnac scale factor.

The scale factor stability of fiber optic gyroscopes (FOGs) is affected by changes in the polarization state of the light in the fiber between the optical source and the MIOC. Changes in stress within the fiber will cause the polarization state of light guided by the fiber to change. This stress may be mechanical or thermal in origin. Any change in polarization state changes the scale factor of the FOG 10 via optical filtering of the light when traversing first the section between the source and the MIOC 20 (made partly of the single mode fiber and partly of polarization maintaining fiber) then traversing the polarizing MIOC 20 itself. This optical filtering can lead to short term scale factor instability and long term degradation of the scale factor repeatability. A depolarizer 18 (e.g., Lyot depolarizer) can be placed in the optical path between the optical source 12 and the MIOC 20 for depolarizing the optical light source signal to prevent changes in its polarization state as it propagates through the FOG 10. Without the depolarizer 18, random environmental perturbations may degrade the scale factor stability via the mechanism of polarization wavelength asymmetries.

However, the existence of large amplitude polarization non-reciprocity (PNR) bias error(s) in FOGs is in large part attributed to cross-coupling and birefringence temperature sensitivities introduced by the depolarizer. The severity and structure of PNR bias error due to various FOG parameters is summarized in Table I below.

TABLE I

Summary of PNR Sensitivity Parameters

| Parameter | Symbol | Effect |
| --- | --- | --- |
| Polarization Extinction Ratio | $\epsilon$ or PER | PNR Amplitude |
| Coherence Function | $\gamma(L)$ | PNR Amplitude |
| Cross-Coupling | $\alpha$ | PNR Amplitude |
| Sagnac Scale Factor | $K_{SSF}$ | PNR Amplitude |
| Birefringence Temperature Sensitivity | $\frac{dB}{dT}$ | PNR Period |

FIG. 2 illustrates a graph of relative PNR amplitude as a function of Lyot depolarizer cross coupling in the prior art FOG of FIG. 1. The cross-coupling is in decibels and is the cross coupling between a first component of the Lyot depolarizer and a second component L2 of the Lyot depolarizer that is coupled at about a 45° angle relative to the first component. As illustrated in FIG. 2, the PNR amplitude reduces proportional to the square-root of the cross coupling, $\sqrt{\alpha}$. As an example, a 3 dB reduction is cross coupling is predicted to result in a 29% reduction in PNR. Extrapolation of the fit confirms that the predicted PNR amplitude is indeed 29% smaller.

In addition, tests confirm that the severity and structure of the PNR bias error is a strong function of Lyot depolarizer length. FIG. 3 is a graph of PNR bias error versus Lyot depolarizer length for a large sample set of prior art production gyros built with various depolarizer lengths. The severity of the PNR bias error is dependent on the length of the Lyot depolarizer due to variation in the coherence function term, $\gamma(L)$. Unless utilizing an alternate design, the optimization of the aforementioned parameters is highly constrained.

The parameters required to minimize cross coupling and to select a minimum of the coherence function associated with the Lyot depolarizer results in degraded depolarization performance, which is an unacceptable alternative. An additional example is the MIOC. The design and manufacturing efforts required to enhance the polarization extinction ratio (PER) of the MIOC by a meaningful amount is costly due to the technology limitations of modern integrated optics chip manufacturing and testing. In order to enhance the state of the art (SoA), it is necessary to leverage an alternate FOG configuration that is capable of manipulating PNR sensitive parameters while leaving other design considerations intact.

SUMMARY

In one embodiment of the invention, a fiber optic gyroscope (FOG) is provided. The FOG comprises a depolarizer that receives light from a light source, a multifunction integrated optic chip (MIOC) and a sensing coil coupled to outputs of the MIOC. The FOG also includes a polarizer coupled between an output of the depolarizer and an input of the MIOC. The polarizer mitigates polarization non-reciprocity (PNR) bias error and enhances the polarization extinction ratio (PER) of the FOG.

In accordance with another embodiment of the invention, a FOG is provided that comprises a Lyot depolarizer that receives light from a light source. The Lyot depolarizer is formed from two polarization maintaining (PM) fiber elements whose orthogonal transmission axes are spliced at a 45° angle from one another. The FOG also comprises a MIOC, a sensing coil coupled to outputs of the MIOC, and a polarizing component with PM fiber pigtails coupled between an output of the depolarizer and an input of the MIOC. The input PM fiber of the polarizing component may double as the second PM fiber segment of the Lyot depolarizer. The length of the output PM fiber of the polarizing component pigtail entering the MIOC is selected to optimize the optical path length to ensure a decoherent PNR bias error associated with the FOG. The polarizing component also enhances the PER of the FOG.

In accordance with another embodiment of the invention, a FOG is provided that comprises a Lyot depolarizer that receives light from a light source. The Lyot depolarizer is formed from two polarization maintaining (PM) fiber elements whose orthogonal transmission axes are spliced at a 45° angle from one another. The FOG also comprises a MIOC, a sensing coil coupled to outputs of the MIOC, and a polarizing fiber coupled between an output of the depolarizer and an input of the MIOC. The length of the polarizing fiber is selected to optimize the optical path length to ensure a decoherent PNR bias error associated with the FOG. The polarizing fiber also enhances the PER of the FOG.

In accordance with yet a further embodiment of the invention, a method of forming a FOG is provided. The method comprises pigtailing a sensing coil to outputs of a multifunction integrated optic chip (MIOC), selecting a polarizer with a length that optimizes the optical path length to ensure that PNR bias error associated with the FOG is decoherent, and pigtailing a second end of the polarizer to an input of the MIOC, wherein the polarizer enhances the polarization extinction ratio (PER) of the FOG. The method further comprises splicing a first end of the polarizer to a second polarization maintaining (PM) fiber element, splicing a first polarization maintaining (PM) fiber element to the second PM fiber element with orthogonal transmission axes disposed at a substantially 45° angle from one another to form a Lyot depolarizer, and splicing the first PM fiber element to an optical splitter that provides light from a light source and receives return light to be provided to a photodetector.

DETAILED DESCRIPTION

The present invention is directed to employing a depolarizer (e.g., a Lyot depolarizer) followed by a polarizer between a light source (e.g., a superluminescent diode (SLD) or broadband fiber source (BFS)) and a multifunction integrated optic chip (MIOC) in a fiber optic gyroscope (FOG). The polarizer mitigates the existence of large amplitude polarization non-reciprocity (PNR) bias error in fiber gyros due in large part to cross-coupling and birefringence temperature sensitivities introduced by the depolarizer and other front end components. Therefore, in accordance with an aspect of the present invention, a secondary polarizer is pigtailed directly to a depolarizer to enhance the polarization extinction ratio (PER) of the system with respect to front end cross couplings.

In addition, careful placement of the secondary polarizer allows for a free segment of fiber that may be selected to optimize the optical path length to ensure a decoherent PNR bias error associated with the FOG. This additional degree of freedom can further reduce PNR bias error. Coherency is a percentage of interference of a signal as a function of optical path length. Therefore, the second polarizer can be tuned in length to select a length that is a minimum of the coherency function to assure that the PNR bias error introduced by the cross-coupling and birefringence temperature sensitivities are decoherent at the output. The secondary polarizer may take the form of a PM pigtailed inline polarizer or a distinct and separate segment of polarizing fiber. The use of polarizing fiber has the added benefits of a smaller component footprint and a reduction in design complexity. The reduced design complexity is attributed to the fact that the entirety of the polarizing element is comprised of fiber, which minimizes the likelihood of introducing spurious cross couplings.

In either case, the predicted PNR bias suppression due to front end cross couplings is anticipated to be proportional to the square root of the PER of the secondary polarizer. Commercially available inline fiber optic polarizers and polarizing fibers are capable of achieving extinction ratios greater than −20 dB corresponding to a PNR amplitude reduction by a factor of ten. Lyot depolarizer experimentation has concluded that the careful selection of PM fiber lengths of the gyro front end may be optimized in order to realize an additional PNR reduction of twenty. In total, the anticipated PNR bias error reduction due to this configuration is anticipated to be approximately two orders of magnitude.

Figure 1:
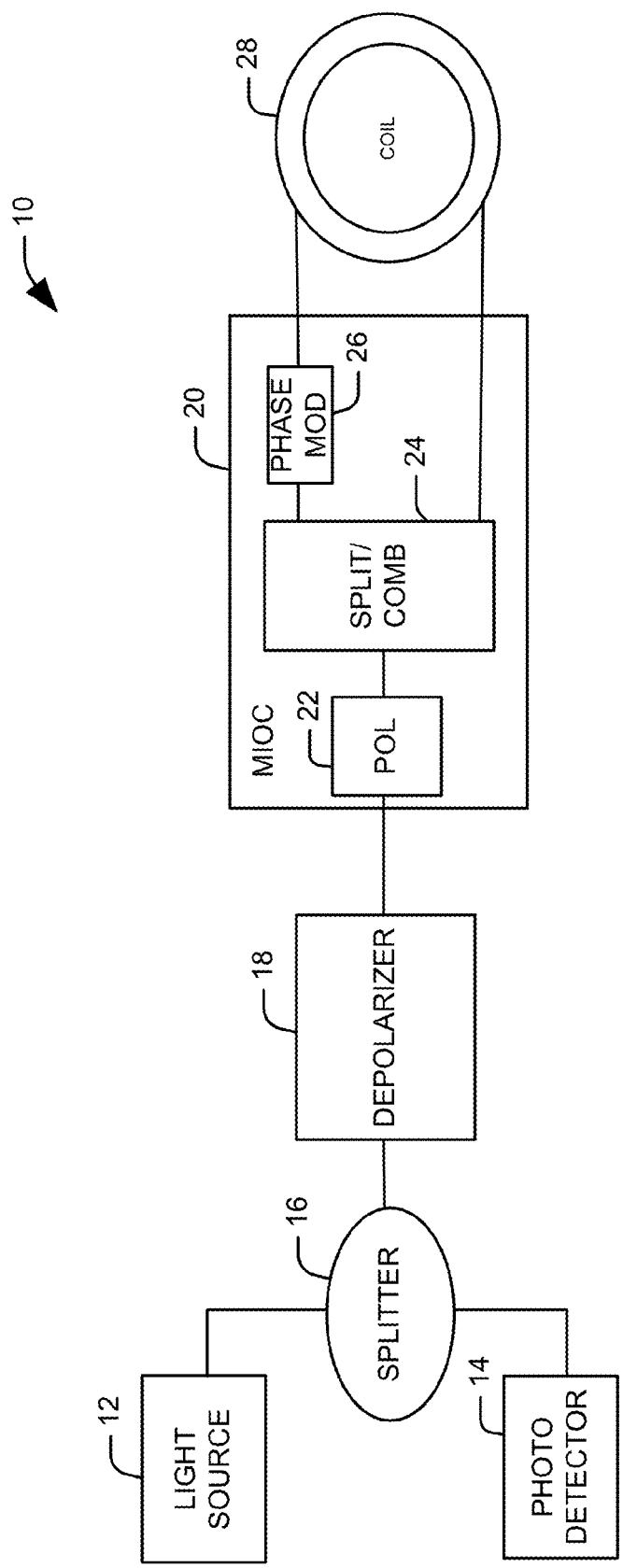
FIG. 1 illustrates a functional block diagram of a prior art fiber optic gyroscope (FOG).
Figure 2:
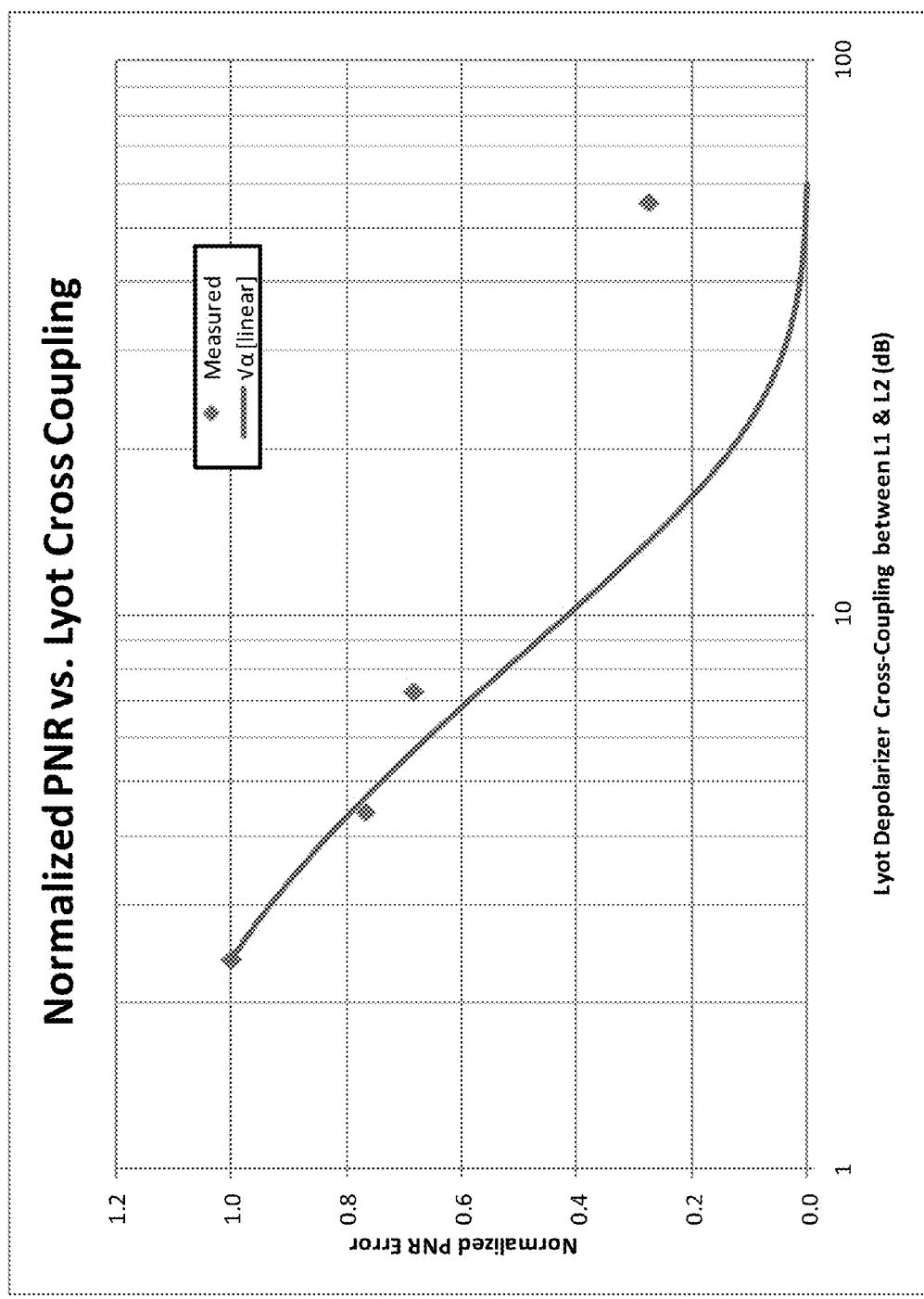
FIG. 2 illustrates a graph of peak-to-peak PNR amplitude as a function of Lyot depolarizer cross coupling in the prior art FOG of FIG. 1.
Figure 3:
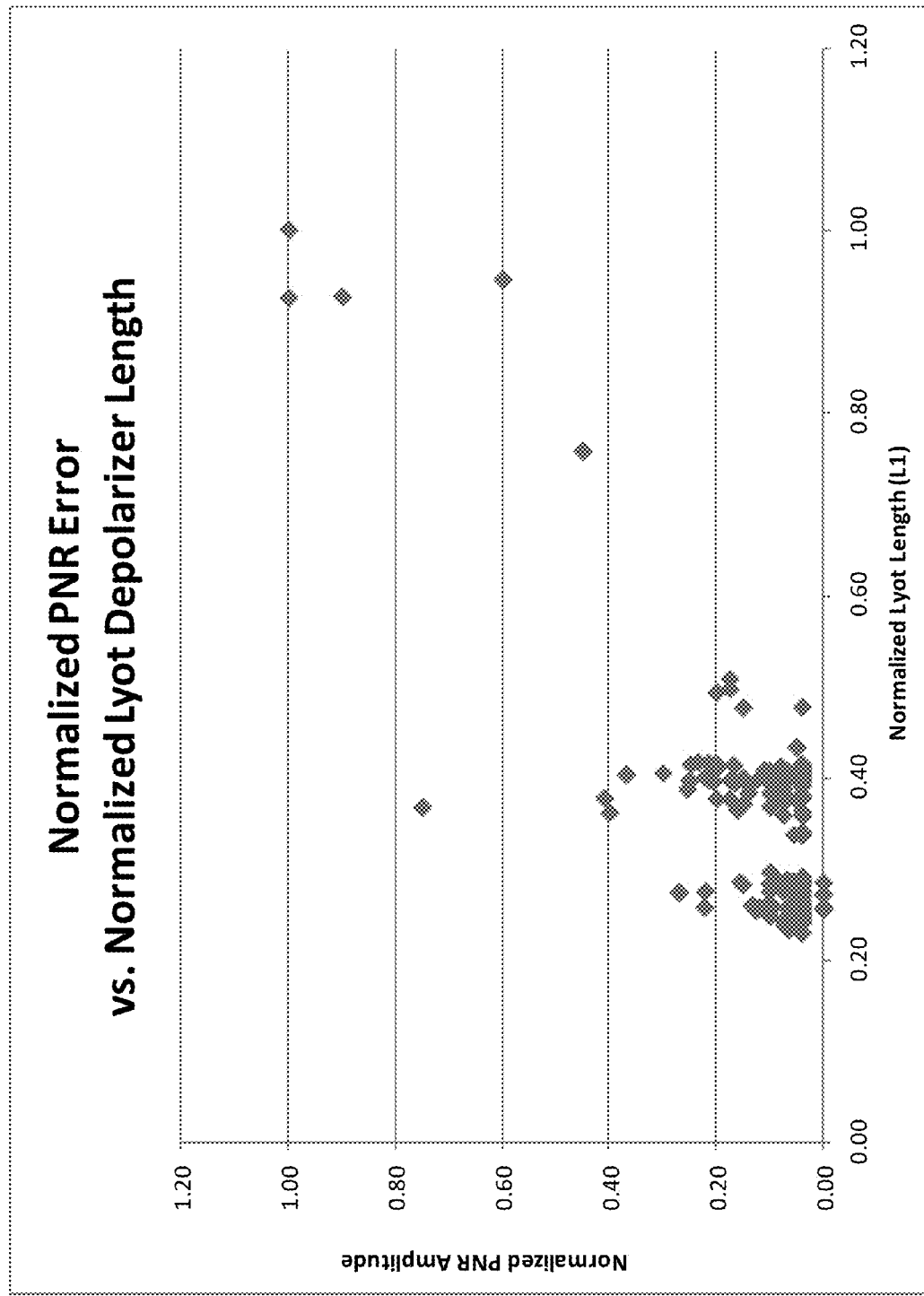
FIG. 3 is a graph of PNR bias error versus Lyot depolarizer length for a large sample set of prior art production gyros built with various depolarizer lengths.
Figure 4:
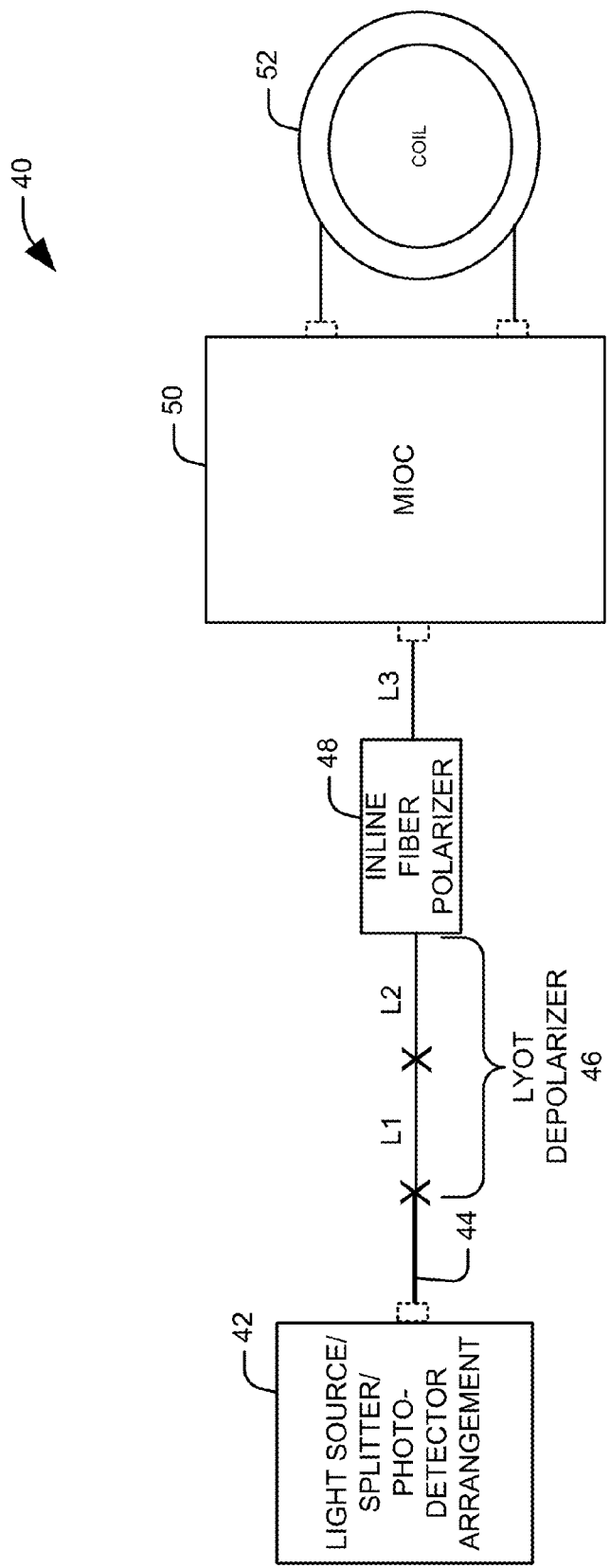
FIG. 4 illustrates a functional block diagram of a FOG in accordance with an embodiment of the present invention.

FIG. 4 illustrates a functional block diagram of a FOG 40 in accordance with an embodiment of the present invention. The FOG 40 includes a light source/splitter/photodetector arrangement 42 similar to the arrangement of the light source 12, splitter 16 and photodetector 14 illustrated in FIG. 1. The light source can be a broadband light source with a low degree of coherence. The light source/splitter/photodetector arrangement 42 is coupled to a single mode (SM) fiber 44 via a pigtail. Splice coupling is indicated by X's, while pigtail coupling is indicated by dashed boxes. The photodetector of the light source/splitter/photodetector arrangement 42 can be a semiconductor device capable of converting optical energy into electrical energy. The photodetector can be coupled to a single mode (SM) fiber. The SM fiber 44 and the SM fiber coupled to the photodetector are spliced to an optical splitter that can be a bidirectional fused taper fiber coupler that includes an additional end coupled to the light source. The optical splitter of the light source/splitter/photodetector arrangement 42 is also coupled to a Lyot Depolarizer 46 through the SM fiber 44.

The Lyot depolarizer 46 includes a first leg L1 and a second leg L2. The Lyot depolarizer 46 can be formed from two high birefringent (HB) polarization maintaining (PM) fiber elements whose orthogonal transmission axes are spliced at a 45° angle from one another. Alternatively, the Lyot depolarizer 46 can be formed of two HB photonic crystal (PC) fibers to further reduce birefringence temperature sensitivity. Furthermore, the Lyot depolarizer 46 can be formed of non-fiber components or the Lyot depolarizer 46 can be a mixed mode Lyot-type depolarizer that utilizes the Lyot effect produced by the combination of fiber and non-fiber components, such as employing crystal substrate material that exhibits substantial birefringence properties.

A PM pigtailed inline fiber polarizer 48 is coupled between the Lyot depolarizer 46 and inputs of a MIOC 50. In an aspect of the invention, the input leg of the inline fiber polarizer 48 doubles as the second leg L2 of the Lyot depolarizer 46 and its length is determined by the Lyot design. An separate output leg L3 of the inline fiber polarizer 48 is pigtailed directly to the MIOC 50 such that the length of output leg L3 can be varied as necessary to minimize PNR bias error while the inline fiber polarizer 48 remains connected between the Lyot depolarizer 46 and the output leg L3. Outputs of the MIOC 50 are pigtailed to opposite ends of a coil 52. The coil 52 is a sensing coil having first and second ends for coupling to the MIOC 50 and for receiving light from the light source 42 that has been split and provided to opposite ends of the coil 52 by the MIOC 50. The sensing coil can be made of polarization maintaining fiber.

The MIOC 50 may comprise any of a number of commercially available optical circuit devices having a birefringent crystal substrate or waveguide. The MIOC 50 can be built on a crystal substrate or waveguide of lithium niobate (LiNbO3) material or any other non-isotropic material suitable for integrated-optic waveguides, and has a housing with three ports providing external connection to an internal waveguide coupler/beam splitter, such as a Y-type waveguide coupler and phase modulator disposed within the housing.

Figure 5:
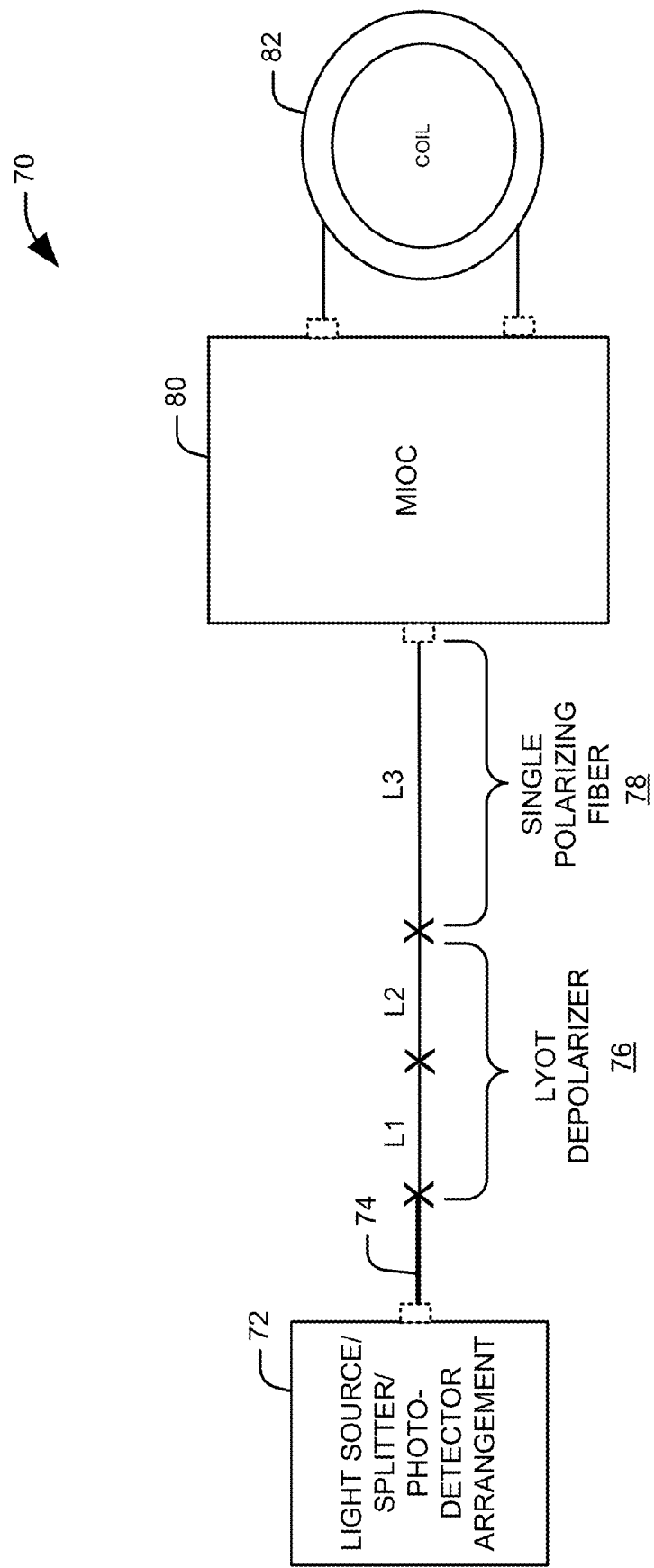
FIG. 5 illustrates a functional block diagram of a FOG in accordance with another embodiment of the present invention.

FIG. 5 illustrates a functional block diagram of a FOG 70 in accordance with another embodiment of the present invention. The FOG 70 includes a light source/splitter/photodetector arrangement 72. The light source of the light source/splitter/photodetector arrangement 72 can be a broadband light source with a low degree of coherence, as described in FIG. 4. The photodetector of the light source/splitter/photodetector arrangement 72 can be a semiconductor device capable of converting optical energy into electrical energy. The photodetector can be coupled to a single mode (SM) fiber. The SM fiber 74 and the SM fiber coupled to the photodetector are also spliced to an optical splitter that can be a bidirectional fused taper fiber coupler that includes an additional end coupled to the light source. The SM fiber 74 is also spliced to a Lyot Depolarizer 76. Splice coupling is indicated by X's, while pigtail coupling is indicated by dashed boxes. The Lyot depolarizer 76 includes a first leg L1 and a second leg L2. The Lyot depolarizer 76 can be formed from two high birefringent (HB) polarization maintaining (PM) fiber elements, two HB photonic crystal (PC) fibers to further reduce birefringence temperature sensitivity, formed of non-fiber components, or the combination of fiber and non-fiber components, as previously described with respect to FIG. 4.

A single polarization fiber L3 78 is coupled between the Lyot depolarizer 76 and inputs of a MIOC 80. A first end of the single polarization fiber 78 can be spliced to an end of the second leg L2 of the Lyot depolarizer 76 and a second end of the single polarization fiber 78 can be pigtailed to an input of a MIOC 80. In an aspect of the invention, the length of the polarization fiber 78 is selected to tune the optical path length to ensure decoherent PNR bias error of the FOG 70. Outputs of the MIOC 80 are pigtailed to opposite ends of a coil 82. The coil 82 is a sensing coil having first and second ends for coupling to the MIOC 80 and for receiving light from the light source 72 that has been split and provided to opposite ends of the coil 82 by the MIOC 80. The sensing coil 82 can be made of polarization maintaining fiber.

Figure 6:
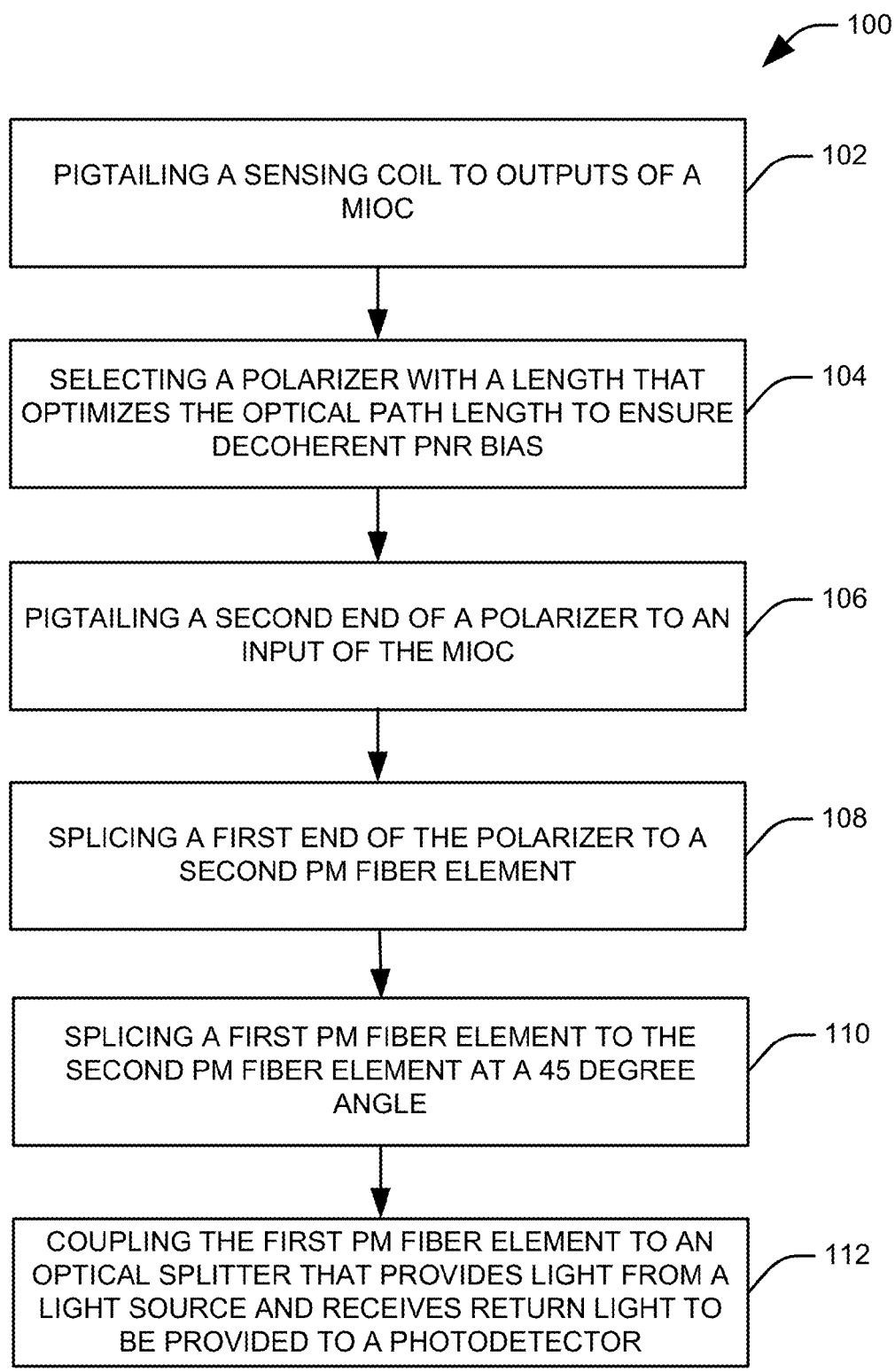
FIG. 6 illustrates a flow diagram of a method for forming a FOG in accordance with an embodiment of the present invention.

In view of the foregoing structural and functional features described above, an example methodology will be better appreciated with reference to FIG. 6. While, for purposes of simplicity of explanation, the methodology of FIG. 6 is shown and described as executing serially, it is to be understood and appreciated that the present invention is not limited by the illustrated order, as some actions could in other examples occur in different orders and/or concurrently from that shown and described herein.

FIG. 6 illustrates a flow diagram of a method 100 for forming a FOG in accordance with an embodiment of the present invention. The method 100 begins at 102 where a first and a second end of a sensing coil are pigtailed to respective first and second output ends of a MIOC. At 104, a polarizer is selected with a length to optimize the optical path length to ensure decoherent PNR bias error associated with the FOG. At 106, a second end of the polarizer is pigtailed to an end of an input to the MIOC. At 108, a first end of the polarizer is spliced to a second PM fiber element. At 110, a first PM fiber element is spliced to the second PM fiber element at a 45° angle relative to the first PM fiber element. At 112, the first PM fiber element is coupled to an optical splitter that provides light from a light source and receives return light to be provided to a photodetector. The polarizer mitigates PNR bias error and enhances the PER of the FOG. The polarizer can be an inline polarizer or a single polarizing fiber element.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A fiber optic gyroscope (FOG) comprising: a depolarizer that receives light from a light source;
   a multifunction integrated optic chip (MIOC); a sensing coil coupled to outputs of the MIOC; and
   an inline fiber polarizer comprising a fiber polarizer and a secondary polarizer, wherein the fiber polarizer is pigtailed to an output of the depolarizer and an input of the secondary polarizer, the secondary polarizer being pigtailed to an input of the MIOC, wherein a length of the secondary polarizer is selected based on a length of the depolarizer and a number of cross-couplings of the depolarizer such that a length of the optical path of the FOG corresponds to a minimum of a coherency function to reduce large amplitude polarization non-reciprocity (PNR) bias error associated with decoherent light waves from the depolarizer by minimizing effects on the FOG from the cross coupling and birefringence temperature sensitivities introduced by the depolarizer and to enhance the polarization extinction ratio (PER) of the FOG, and wherein the length of the secondary polarizer is selected such that the square root of the PER associated with the secondary polarizer is proportional to a reduction factor in PNR bias error based on the cross couplings and birefringence temperature sensitivities introduced by the depolarizer.

2. The FOG of claim 1, wherein an input leg to the inline fiber polarizer doubles as a second leg of the depolarizer.

3. The FOG of claim 1, wherein the length of the secondary polarizer is a portion of the length between the fiber polarizer and the MIOC.

4. The FOG of claim 1, wherein the depolarizer is a Lyot depolarizer.

5. The FOG of claim 4, wherein the Lyot depolarizer is formed from one or more non-fiber components.

6. The FOG of claim 4, wherein the Lyot depolarizer is formed from two polarization maintaining (PM) fiber elements whose orthogonal transmission axes are spliced at a substantially 45° angle from one another.

7. The FOG of claim 6, wherein PM maintaining fiber elements are at least one of high birefringent (HB) polarization maintaining (PM) fiber elements and HB photonic crystal (PC) fibers elements.

8. The FOG of claim 1, wherein the optical path length of the FOG includes an optical path length of the MIOC, an optical path length of the depolarizer, and the length of the inline fiber polarizer.

9. The FOG of claim 1, wherein the optical path length of the FOG corresponds to the coherence length of the light source.

10. A fiber optic gyroscope (FOG) comprising:
a Lyot depolarizer that receives light from a light source, the Lyot depolarizer being formed from two polarization maintaining (PM) fiber elements whose orthogonal transmission axes are spliced at a substantially 45° angle from one another; a multifunction integrated optic chip (MIOC); a sensing coil coupled to outputs of the MIOC; and
an inline fiber polarizer comprising a fiber polarizer and a secondary polarizer,
wherein the fiber polarizer is pigtailed to an output of the depolarizer and an input of the secondary polarizer, the secondary polarizer being pigtailed to an input of the MIOC,
wherein the length of the secondary polarizer is selected based on a length of the depolarizer and a number of cross-couplings of the depolarizer such that a length of the optical path of the FOG corresponds to a minimum of a coherency function to reduce large amplitude polarization nonreciprocity (PNR) bias error associated with decoherent light waves from the Lyot depolarizer by minimizing effects on the FOG from the cross coupling and birefringence temperature sensitivities introduced by the Lyot depolarizer and to enhance polarization extinction ratio (PER) of the FOG, and
wherein the length of the secondary polarizer is selected such that the square root of the PER associated with the secondary polarizer is proportional to a reduction factor in PNR bias error based on the cross couplings and birefringence temperature sensitivities introduced by the depolarizer.

11. The FOG of claim 10, wherein PM maintaining fiber elements are at least one of high birefringent (HB) polarization maintaining (PM) fiber elements and HB photonic crystal (PC) fibers elements.

12. A method of forming a fiber optic gyroscope (FOG), the method comprising:
pigtailing a sensing coil to outputs of a multifunction integrated optic chip (MIOC); selecting an inline fiber polarizer comprising a fiber polarizer and a secondary polarizer;
selecting a length of the secondary polarizer that is based on a length of the depolarizer and a number of cross-couplings of the depolarizer such that a length of the optical path of the FOG reduces large amplitude polarization nonreciprocity (PNR) bias error associated with decoherent light waves by minimizing effects on the FOG from cross coupling and birefringence temperature sensitivities introduced by a Lyot depolarizer;
pigtailing a second end of the secondary polarizer to an input of the MIOC, wherein the polarization extinction ratio (PER) of the FOG is enhanced by the secondary polarizer, and
wherein the length of the secondary polarizer is selected such that the square root of the PER associated with the secondary polarizer is proportional to a reduction factor in PNR bias error based on cross couplings and birefringence temperature sensitivities introduced by the Lyot depolarizer;
splicing a second end of the fiber polarizer with a first end of the secondary polarizer;
splicing a first end of the fiber polarizer to a second polarization maintaining (PM) fiber element;
splicing a first polarization maintaining (PM) fiber element to the second PM fiber element with orthogonal transmission axes disposed at a substantially 45° angle from one another to form the Lyot depolarizer; and
splicing the first PM fiber element to an optical splitter that provides light from a light source and receives return light to be provided to a photodetector.

13. The method of claim 12, wherein PM maintaining fiber elements are at least one of high birefringent (HB) polarization maintaining (PM) fiber elements and HB photonic crystal (PC) fibers elements.

* * * * *